United States Patent
Antoni et al.

(10) Patent No.: US 11,280,916 B2
(45) Date of Patent: Mar. 22, 2022

(54) SYSTEM FOR CHECKING THE PLAUSIBILITY OF SATELLITE SIGNALS FROM GLOBAL NAVIGATION SYSTEMS

(71) Applicant: Continental Teves AG & Co. oHG, Frankfurt (DE)

(72) Inventors: Henrik Antoni, Freigericht (DE); Pierre Blüher, Hattersheim (DE); Ulrich Stählin, Oakland Township, MI (US); Michael Zalewski, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 79 days.

(21) Appl. No.: 15/977,296

(22) Filed: May 11, 2018

(65) Prior Publication Data
US 2018/0259650 A1 Sep. 13, 2018

Related U.S. Application Data

(63) Continuation of application No. PCT/DE2016/200514, filed on Nov. 10, 2016.

(30) Foreign Application Priority Data

Dec. 11, 2015 (DE) ............ 10 2015 222 355.8
Oct. 2, 2016 (DE) ............ 10 2016 201 980.5

(51) Int. Cl.
*G01S 19/42* (2010.01)
*G01S 19/33* (2010.01)
(Continued)

(52) U.S. Cl.
CPC ............ *G01S 19/423* (2013.01); *G01S 19/20* (2013.01); *G01S 19/215* (2013.01); *G01S 19/33* (2013.01); *G01S 19/36* (2013.01); *G01S 19/426* (2013.01)

(58) Field of Classification Search
CPC ...... G01S 19/423; G01S 19/20; G01S 19/215; G01S 19/33; G01S 19/36; G01S 19/426
See application file for complete search history.

(56) References Cited

U.S. PATENT DOCUMENTS 5,512,903 A    4/1996  Schmidtke
5,969,670 A   10/1999  Kalafus et al.
(Continued)

FOREIGN PATENT DOCUMENTS

CN    203191557 U    9/2013
CN    103797380 A    5/2014
(Continued)

OTHER PUBLICATIONS

International Search Report and Written Opinion dated Mar. 2, 2017 from corresponding International Patent Application No. PCT/DE2016/200514.
(Continued)

*Primary Examiner* — Donald HB Braswell

(57) ABSTRACT

A system for receiving and processing satellite signals from satellites of global navigation systems, in particular for a vehicle, having a signal path includes a signal conditioning unit for conditioning received satellite signals, an analysis unit for analyzing the conditioned satellite signals, and a position determination unit for determining measured values utilizing the satellite signals provided by the analysis unit. The measured values include a position, a speed, and/or a satellite time. The system has two signal paths which are separate from one another and each process mutually independent satellite signals for a position.

15 Claims, 2 Drawing Sheets

(51) Int. Cl.
*G01S 19/36* (2010.01)
*G01S 19/20* (2010.01)
*G01S 19/21* (2010.01)

(56) References Cited

U.S. PATENT DOCUMENTS

| | | |
|---|---|---|
| 6,377,892 B1 | 4/2002 | Johnson et al. |
| 6,570,531 B1 | 5/2003 | Stratton et al. |
| 6,577,951 B1 | 6/2003 | Johnson et al. |
| 7,283,090 B2 | 10/2007 | Dentinger et al. |
| 8,527,139 B1 | 9/2013 | Yousuf |
| 8,600,671 B2 | 12/2013 | Wang |
| 8,855,867 B2 | 10/2014 | Gunthner |
| 9,672,095 B2 | 6/2017 | Robertson et al. |
| 2005/0146459 A1 | 7/2005 | Dentinger |
| 2008/0191935 A1 | 8/2008 | Tidwell |
| 2009/0284410 A1 | 11/2009 | Trautenberg |
| 2011/0054716 A1 | 3/2011 | Stahlin et al. |
| 2011/0118979 A1 | 5/2011 | Mao et al. |
| 2012/0004846 A1 | 1/2012 | Coatantiec et al. |
| 2012/0038512 A1* | 2/2012 | Geswender ............ G01S 19/21 342/357.59 |
| 2013/0176168 A1 | 7/2013 | Lo et al. |
| 2014/0097984 A1* | 4/2014 | Stevens ................ G01S 19/20 342/357.58 |
| 2014/0306842 A1* | 10/2014 | Alizadeh-Shabdiz ..................... G01S 19/13 342/357.51 |
| 2014/0333479 A1 | 11/2014 | Steinhardt |
| 2014/0368379 A1* | 12/2014 | Lennen ................ G01S 19/33 342/357.25 |
| 2015/0309179 A1 | 10/2015 | Jantz et al. |
| 2015/0330792 A1 | 11/2015 | Stahlin et al. |
| 2016/0033649 A1* | 2/2016 | Mathews .......... H04B 7/18513 342/357.48 |

FOREIGN PATENT DOCUMENTS

| | | |
|---|---|---|
| CN | 104090565 A | 10/2014 |
| CN | 104237904 A | 12/2014 |
| DE | 102010063984 A1 | 8/2011 |
| DE | 102012216218 A1 | 3/2013 |
| FR | 3020469 A1 | 10/2015 |
| WO | 0139364 A1 | 5/2001 |
| WO | 2015067374 A1 | 5/2015 |
| WO | 2015165908 A1 | 11/2015 |

OTHER PUBLICATIONS

German Search Report dated Jan. 24, 2017 for corresponding German Patent Application No. 10 2016 201 980.5.
Wegner, Marco et al., A Measurement Standard for Vehicle Localization and Its ISO-Compliant Measurement Uncertainty Evaluation, IEEE Transactions on Instrumentation and Measurement „Jul. 17, 2012, pp. 3003-3013, vol. 61, Issue 11.
Debiao, Lu et al., Methods for Certification of GNSS-based Safe Vehicle Localisation in Driving Assistance Systems, 2015 International Conference on Connected Vehicles and Expo (ICCVE), Oct. 19-23, 2015, IEEE , Apr. 7, 2016, ISSN 2378-1297.
International Search Report and Written Opinion dated Mar. 2, 2017 from corresponding International Patent Application No. PCT/DE2016/200515.
Chinese Office Action dated Feb. 20, 2021 for the counterpart Chinese Patent Applicaion No. 201680061587.4.
Chinese Second Office Action dated Oct. 9, 2021 for the counterpart Chinese Patent Application No. 201680061587.4.
Zhao Lin, Satellite Navigation System, Harbin Engineering University Press, published on the year 2001.
U.S. Appl. No. 15/977,439.

\* cited by examiner

SYSTEM FOR CHECKING THE PLAUSIBILITY OF SATELLITE SIGNALS FROM GLOBAL NAVIGATION SYSTEMS

CROSS REFERENCE TO RELATED APPLICATION

This application is a continuation of International application No. PCT/DE2016/200514, filed Nov. 10, 2016, which claims priority to German patent application Nos. 10 2015 222 355.8, filed Nov. 12, 2015, and 10 2016 201 980.5, filed Feb. 10, 2016, each of which is hereby incorporated by reference.

TECHNICAL FIELD

The technical field relates generally to receiving and processing satellite signals from satellites of global navigation systems and particularly to determining a position with the satellite signals.

BACKGROUND

With the increase in the degree of automation of driver assistance systems in vehicles, the importance of precise and verified position information relating to the vehicle is increasing. Many driver assistance systems function properly only when the determined position data relating to the vehicle are precise and correct. For example, a driver assistance system which warns of a collision at an intersection must know exactly where the respective vehicles which are driving toward the intersection are situated. An incorrectly determined position of the respective vehicles could result in either an incorrect warning being output or a warning being output too late. In addition, there are driver assistance systems which carry out driving maneuvers independently and in a fully automated manner. Depending on the driving situation, such driving maneuvers may take place in safety-critical situations in which it is absolutely necessary to accurately and correctly determine the position of the vehicle.

As such, it is desirable to present a system and method to make determination of the position of the vehicle more reliable with respect to errors and interfering influences. In addition, other desirable features and characteristics will become apparent from the subsequent summary and detailed description, and the appended claims, taken in conjunction with the accompanying drawings and this background.

BRIEF SUMMARY

According to a first aspect, a system includes two signal paths which are separate from one another and each process mutually independent satellite signals for a position.

Satellite signals from global navigation systems for a position contain information which allows the position to be determined in two ways. The system uses this fact and sets up two mutually independent signal paths in order to therefore achieve redundancy in the position determination. On this basis, different evaluations can then be carried out in order to increase the reliability and accuracy of the position determination. These are described in more detail below in connection with the advantageous embodiments.

Within the scope of this disclosure, independent satellite signals for a position are intended to be understood as meaning satellite signals which allow a conclusion to be drawn on the same position or substantially the same position, but can be evaluated in a manner separated from one another and independently of one another. This is therefore an independence of the information content of the satellite signals. The satellite signals may very well have been sent at the same time by a satellite. The satellite signals are related to one another or linked to one another by the reference to the same or substantially the same position.

An analysis unit is intended to be understood as meaning a unit which can establish a correlation between the satellite signals and the respective satellites on the basis of the conditioned signals. The analysis unit could therefore also be referred to as a correlation unit. The analysis unit analyzes the conditioned satellite signals and in this manner makes it possible to assign the satellite signals to the respective satellites and to the respective positions.

The system is developed by virtue of the fact that the analysis unit is configured to separate the satellite signals from one another on the basis of one or more signal properties and to provide the position determination units with those satellite signals which are independent of the satellite signal for the other position determination unit. This means that the position determination units receive satellite signals which are independent of one another but are suitable for determining the same position. If one of the satellite signals has an error or has been falsified, it would inevitably result in a difference between the determined positions from the position determination units. Within the scope of this disclosure, separation can also be understood as meaning filtering or sorting or selecting correct satellite signals. This makes it possible to quickly detect interfering influences such as multipath or possible falsifiers such as jammers or spoofers. The important factor is that such positions are not used further inside a vehicle.

The system may be developed by virtue of the fact that the analysis unit is configured to separate the satellite signals according to the frequencies of the satellite signals. In this manner, the system uses the fact that the satellites, for example GPS satellites, transmit the satellite signals for a position at a plurality of frequencies. These can be evaluated independently of one another by the system. The analysis separates these satellite signals and supplies the respective satellite signals to the position determination units.

The system may be developed by virtue of the fact that the analysis unit is configured to separate the satellite signals according to a satellite signal type, in particular GPS, Glonass, Beidou and Galileo. In this manner, errors can be detected by a satellite navigation system and the plausibility of said errors can be checked and said errors can possibly be corrected by satellite signals from other navigation systems. The reliability of the system is particularly increased in this manner since the system does not depend solely on the satellite signals from one satellite navigation system.

The system may include a localization unit for receiving the measured values determined by the position determination unit and for determining measured values whose plausibility has been checked. The measured values determined by the position determination units are combined and evaluated in the localization unit. Since the position determination units determine the position data for a position independently of one another, differences and errors can be quickly detected and possibly corrected in this manner.

The system may be advantageously developed by virtue of the fact that the localization unit is configured to compare the determined measured values from the position determination units with one another and to determine differences between the respective types of measured values.

The system may be developed in a manner by virtue of the fact that the localization unit is configured to compare the determined positions from the position determination units with one another and to correct the position or to reject the determined position and to possibly replace it with data relating to the position from other sources if the difference exceeds a threshold value. This ensures that the determined positions are plausible with respect to one another. If the difference between the positions exceeds a threshold value, it can be assumed that one of the signal paths or both signal paths is/are subject to an error and these positions must not be used without restriction. Further alternative steps can be initiated depending on whether a position is required in a driving situation and the absence of a position could cause a safety-critical state.

The system may be developed by virtue of the fact that the threshold value is in a range of 3 m to 5 m, is preferably 4 m, particularly preferably 4.10 m. These ranges have proved to be particularly useful and appropriate for use in driver assistance systems in order to ensure that the system according to the invention operates in a stable manner.

The system may be developed by virtue of the fact that the localization unit is designed to compare the satellite signals in the first signal path which are conditioned by the signal conditioning unit with the satellite signals in the second signal path. This makes it possible to detect errors in the satellite signals in good time by means of a comparison, possibly on the basis of particular criteria or properties of the satellite signals.

The system may be developed by virtue of the fact that the localization unit is designed to compare the satellite signals in the first signal path which are conditioned by the analysis unit with the satellite signals in the second signal path. This embodiment constitutes a further comparison stage which enables the plausibility of the satellite signals with respect to one another.

The system may be developed by virtue of the fact that the localization unit is designed to determine a corrected position whose plausibility has been checked with the aid of alternative locating methods for a vehicle. These alternative locating methods may be carried out, for example, by means of environmental sensors, for example camera, radar, lidar, laser scanner, ultrasound, in particular in conjunction with an environmental model. It is also possible to carry out a locating method utilizing position information from other vehicles or infrastructure units which communicate with the vehicle. Further locating methods can be carried out by means of WLAN localization or mobile radio localization or by means of data from the odometry sensors, for example acceleration sensors, wheel speed sensors, yaw rate sensors, steering angle sensors, etc.

The system may be developed by virtue of the fact that the localization unit is designed to create a movement trajectory on the basis of past positions whose plausibility has been checked and to identify a discontinuity between the currently determined position and the movement trajectory. Assuming that the vehicle carries out a constant and continuous movement sequence, discontinuous position information can be attributed to an error in satellite signals or in the evaluation of these satellite signals. In this respect, it may initially suffice to use only the movement trajectory which has already been covered.

The system may be developed by virtue of the fact that the localization unit is designed to extend the movement trajectory into the future by means of odometry data, in particular sensor data from wheel speed sensors, steering angle sensors or inertial sensors. In this manner, the plausibility of the positions which have been determined and/or whose plausibility has been checked is checked further using the movement trajectory in the past and in the future.

According to a second aspect, a method of determining a position of the vehicle is also provided, wherein the satellite signals are separated from one another on the basis of one or more signal properties and the position determination units are provided with that satellite signal which is respectively independent of the satellite signal for the other position determination unit.

The method may be developed by virtue of the fact that a localization unit of the system receives the measured values determined by means of the position determination units and determines measured values whose plausibility has been checked. Measured values whose plausibility has been checked can be determined by combining, selecting and correcting the available measured values.

The method may be developed by virtue of the fact that the determined measured values from the position determination units are compared with one another and differences between the respective types of measured values are determined by means of the localization unit.

The method may be developed by virtue of the fact that the localization unit compares the determined positions from the position determination units with one another and corrects the position or rejects the determined position if the difference exceeds a threshold value. With respect to the definition of the threshold value, reference is made to the statement above.

Further advantageous embodiments of the method emerge in connection with the embodiments of the system as described herein.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
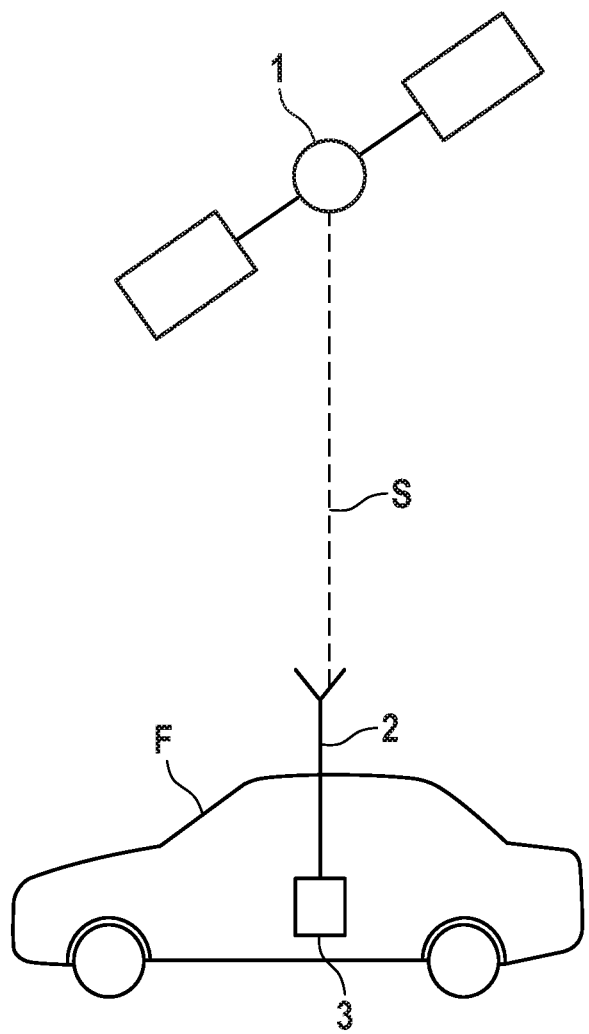
FIG. 1 shows a schematic illustration of an application of the system.

FIG. 1 shows a vehicle F having a system 3 and an antenna 2 for receiving satellite signals S from a global satellite navigation system. A satellite 1 is illustrated, by way of example, in FIG. 1. At least four satellites are needed to determine the position of the vehicle F. A vehicle usually receives satellite signals from more than four satellites in an average field of view, with the result that there is redundancy of the satellite signals. Since the satellite signals are separated utilizing an analysis unit, as also described below, the number of satellite signals and the types of satellite signals received can remain open for the subsequent description. Satellite signal S is therefore understood as meaning the sum of all received satellite signals.

The antenna 2 for receiving the satellite signals S is sufficiently well known from the prior art. The antenna 2 is connected to the system 3 and transmits the received satellite signals S to the system 3. In this exemplary embodiment, as can also be seen in FIG. 2, the antenna 2 is not part of the system 3. Alternatively, however, it is also conceivable to design the antenna 2 as part of the system 3.

Figure 2:
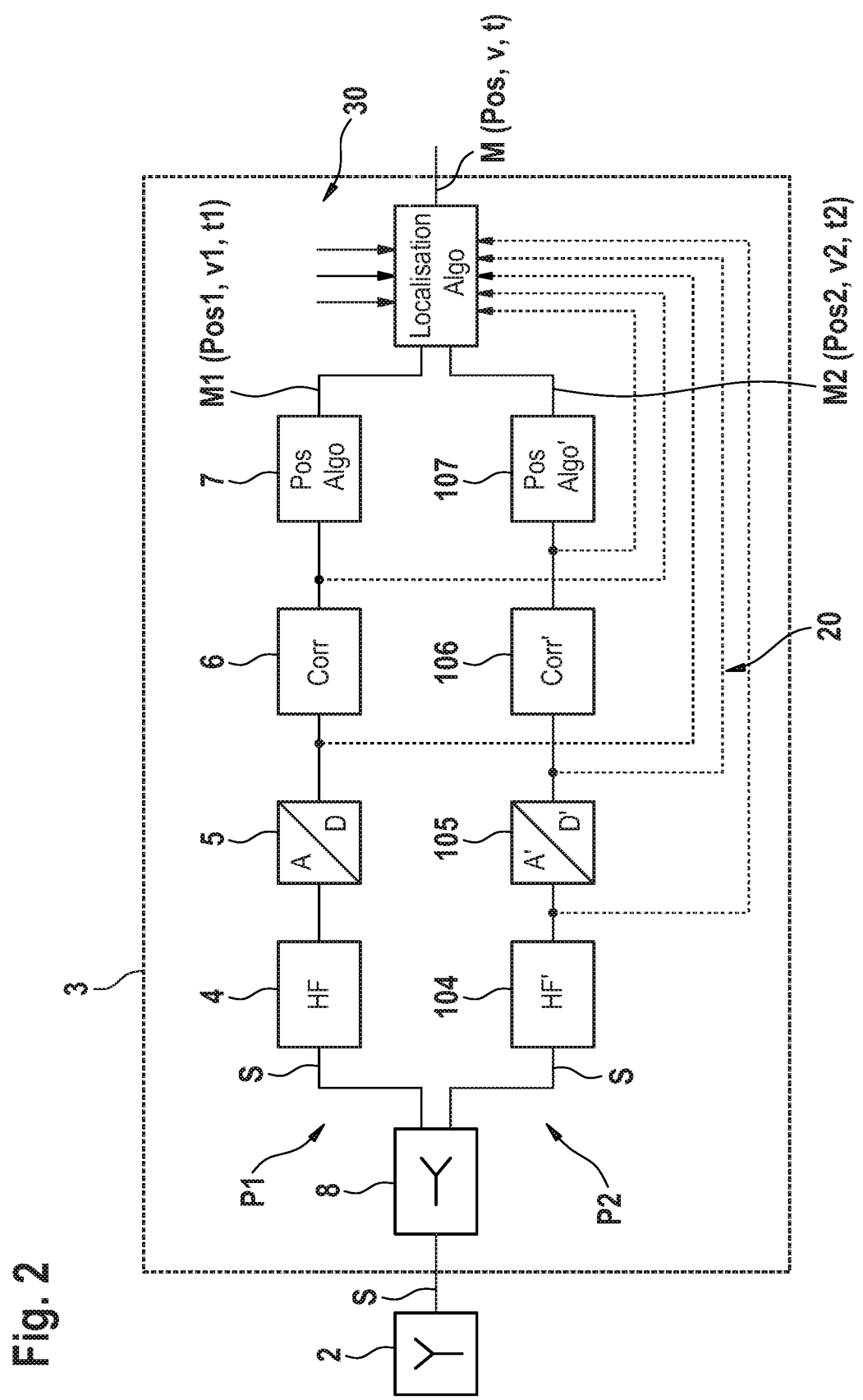
FIG. 2 shows a block diagram of an exemplary embodiment of the system.

FIG. 2 shows a block diagram of the system 3. The satellite signals S received by the antenna 2 are separated by a splitter 8 into the two signal paths P1, P2 at the input of the system according to the invention. Each signal path P1, P2 comprises a signal conditioning unit 4, 5, 104, 105 for conditioning received satellite signals S, an analysis unit 6, 106 for analyzing the conditioned satellite signals, and a position determination unit 7, 107 for determining measured values M1, M2. The measured values M1, M2 each include a position Pos1, Pos2, a speed v1, v2, and/or a satellite time t1, t2.

In this exemplary embodiment, the signal conditioning units 4, 5, 104, 105 each comprise a high-frequency part 4, 104 or a demodulator for demodulating and conditioning the satellite signals S and an analog/digital converter 5, 105. The satellite signals are each first of all demodulated and conditioned in the high-frequency part 4, 104 in such a manner that the analog/digital converter 5, 105 can generate a digital satellite signal therefrom. The digitized satellite signals are then forwarded to the analysis units 6, 106, also referred to as the correlation unit 6, 106.

The correlation unit 6, 106 receives, from the analog/digital converter 5, 105, satellite signals which represent the entire information bandwidth, that is to say the satellite signals from a plurality of satellites at a plurality of frequencies from different satellite navigation systems. The analysis unit 6, 106 separates the data in such a manner that the satellite signals can be assigned to the respective satellites, frequencies and satellite navigation systems and can be individually selected and forwarded. The satellite signals are now selected by means of the analysis unit 6, 106, such that the position determination units 7, 107 in the different signal paths P1, P2 can determine the same position independently of one another. This selection can be made on the basis of different criteria. On the one hand, the frequency used in the satellite signals can be used to allocate or transmit the satellite signals which have been transmitted at a first frequency to the first position determination unit 7 and to assign the satellite signals which have been transmitted at a second frequency to the second position determination unit 107. In addition, it is also possible to assign satellite signals from a first satellite navigation system type, for example GPS, to the first position determination unit 7 and to assign satellite signals from a second satellite navigation system type, for example Galileo, to the second position determination unit 107. It is also conceivable to combine both criteria with one another. Ideally, the separation according to frequency is already carried out in the signal conditioning units 4, 104 in order to save computing power. However, if the system is intended to remain flexible, this distinction can also be made only in the analysis units 6, 106.

Separation according to Global Navigation Satellite System ("GNSS") or navigation system type makes it possible to detect when only one of the systems is faulty or has interference, for example selective availability in the case of GPS, which is artificially impaired positioning as a result of impaired signals on the satellite side.

If the signal path is separated according to frequencies, it is possible to detect differences between the two signal paths P1, P2, for example caused by multipath which has a different effect on different frequencies, by comparing the measurement from a first frequency for a first satellite and a second frequency for the first satellite. The position is determined in redundant signal paths separately from one another in order to minimize the risk of common errors, so-called common causes. In this case, the transmitted data content of the satellite signal, so-called navigation message, which is equivalent in both signal paths, even though not identical, as compared in order to detect transmission errors and simple incorrect data. This is possible by virtue of the evaluation of the data content or the satellite signals being determined, stored and transmitted differently. Jammers (HF interferers) also usually affect only one frequency or at least affect the different frequency bands differently. Spoofing hardware which deliberately feigns GNSS signals in a falsified manner becomes considerably more complicated for a second frequency, which reduces the probability of data falsification. The complexity increases further if two different antennas are additionally used in this case for the different frequency paths. Synchronous playback to both antennas, which then also constitute the respectively correct trajectory course and contain certain signal correlations and exclude others, make signal falsification virtually impossible with a reasonable amount of effort.

The position determination units 7, 107 determine the position, speed, and/or satellite time independently of one another on the basis of the satellite signals transmitted by the analysis unit 6, 106. Ideally, the measured values determined in this manner should correspond to one another. In order to check this, the results or the measured values from the position determination units 7, 107 are combined and evaluated in a localization unit 9.

The localization unit compares the measured values determined by the position determination units 7, 107, that is to say, the position, speed and/or satellite time. The measured values M1, M2 and their difference from one another can be assessed by means of threshold values. For example, a threshold value is predefined for a maximum difference between the positions Pos1, Pos2 in the signal paths P1, P2, which must not be exceeded. The value can be in the range of 3 m to 5 m, for example, or can preferably be 4 m, particularly preferably 4.10 m. If, for example, there is a difference between the position determined by the first position determination unit 4 and the position determined by the second position determination unit 104, it can be assumed that some of the satellite signals are incorrect. This can be attributed, for example, to the fact that certain errors such as multipath or falsifications caused by jammers or spoofers have a greater influence on particular frequencies than other frequencies. However, the redundancy and independence of the signal paths make it possible to exclude common errors resulting in an identical error type having an effect on both parts of the satellite signals or signal paths P1, P2.

The localization unit 9 is also connected to odometry sensors, in particular wheel speed sensors, steering angle sensors and/or acceleration sensors. Further checks of the plausibility of the position can be carried out on the basis of the data from the odometry sensors 30. The localization unit 9 can also be linked to further locating methods of other systems, for example environmental sensors, position determination by means of data from other vehicles or infrastructure units, WLAN localization, mobile radio localization etc. A further plausibility check which is independent of satellite signals can be carried out by means of these further locating methods.

The localization unit is also connected to the signal paths P1, P2 in such a manner that the satellite signals which are processed by the analog/digital converters 5, 105 or analysis units 6, 106 can be tapped off by the localization unit 9. In this manner, the satellite signals which have been processed further can be compared in stages in order to determine an error in the satellite signals in good time.

If the output signals from the A/D converter 5, 105 are compared 20 in the localization unit 9, anomalies based on a signal change from the primary path to the secondary path can already be detected early. As a result of the satellite signals S being analyzed inside the analysis unit 6, 106, it is also possible to analyze the satellite information in order to remove signals which have interference from the subsequent position determination in the localization unit. Alternatively, however, it is also possible to carry out a comparison in the position determination units 7, 107, rather than inside the localization unit 9.

A further plausibility check of the measured values M1, M2 can be carried out in the localization unit 9 in such a manner that a movement trajectory is created on the basis of past positions whose plausibility has been checked and a discontinuity between the currently determined position and the movement trajectory is detected. The movement trajectory can be extended into the future by trajectory sections by means of odometry data, in particular sensor data from a wheel speed sensor, a steering angle sensor or an inertial sensor.

The localization unit 9 is equipped with an output via which the measured values M whose plausibility has been checked, that is to say the position P, the speed v and/or the satellite time t, are then output and are made available to further systems inside a vehicle F.

The system 4 may be in the form of an electronic component, one or more integrated circuits or a chip which carries out a method according to the invention for determining a position whose plausibility has been checked. Here, the method includes:

receiving the satellite signals S, distributing the satellite signals S to each signal path P1, P2, conditioning the satellite signals S by means of the signal conditioning unit 4, 5, 104, 105, analyzing the conditioned satellite signals by means of the analysis unit 6, 106, wherein the satellite signals are separated from one another on the basis of one or more signal properties and the position determination units 7, 107 are provided with those satellite signals which are each independent of the satellite signal for the other position determination unit 7, 107.

The method may take place in the localization unit 9 of the system 3 in such a manner that the localization unit determines measured values M whose plausibility has been checked on the basis of the measured values M1, M2 determined by the position determination units. The determined measured values from the position determination units 7, 107 are compared with one another and a difference between the respective types of measured values is determined by means of the localization unit 9. If the difference exceeds a threshold value, the localization unit 9 corrects the position or rejects the determined position provided that this does not restrict the function. It is possibly also possible to carry out a correction by means of the localization units on the basis of other position data.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for determining a position of a vehicle, the system supported by the vehicle and comprising:
    an antenna configured to receive satellite signals from satellites of global navigation systems;
    a splitter for separating the satellite signals onto a first signal path and a second signal path separate and independent from the first signal path;
    a first signal conditioning unit for conditioning the received satellite signals along the first signal path;
    a second signal conditioning unit for conditioning the received satellite signals along the second signal path;
    a first analysis unit for analyzing the conditioned satellite signals along the first signal path;
    a second analysis unit for analyzing the conditioned satellite signals along the second signal path;
    a first position determination unit for determining measured values including at least two of a first position, a first speed, and a first satellite time utilizing the analyzed satellite signal provided by the first analysis unit, wherein the analyzed satellite signals provided by the first analysis unit are within a first frequency of a first satellite signal type;
    a second position determination unit for determining measured values including at least two of a second position, a second speed, and a second satellite time utilizing the analyzed satellite signals provided by the second analysis unit, wherein the analyzed satellite signals provided by the second analysis unit are within a second frequency of the first satellite signal type; and
    a localization unit configured to:
    compare the satellite signals along the first signal path with the satellite signals along the second signal path;
    determine an error in the satellite signals based on the comparison;
    determine a difference by comparing the first position and the second position;
    when the difference exceeds a threshold value, determine that the first signal path and/or the second signal path are subject to the error; and
    when the difference does not exceed the threshold value, determine the position based on the first position and the second position.

2. The system as set forth in claim 1, wherein at least one of the analysis units is configured to separate the satellite signal on the basis of one or more signal properties and to provide the respective position determination unit with those satellite signals which are independent of the satellite signals for the other position determination unit.

3. The system as set forth in claim 1, wherein at least one of the analysis units is configured to separate the satellite signals according to the frequencies of the satellite signals.

4. The system as set forth in claim 1, wherein the localization unit receives the measured values determined by the position determination units and determines measured values whose plausibility has been checked.

5. The system as set forth in claim 4, wherein the localization unit is configured to compare the determined measured values from the first position determination unit to the determined measured values from the second position determination unit to determine differences between the respective types of measured values.

6. The system as set forth in claim 4, wherein the localization unit rejects at the first position or the second position when the difference exceeds a threshold value.

7. The system as set forth in claim 6, wherein the threshold value is in a range of 3 m to 5 m.

8. The system as set forth in claim 4, wherein the localization unit is configured to compare the satellite signal in the first signal path which are conditioned by the first signal conditioning unit with the satellite signal in the second signal path.

9. The system as set forth in claim 4, wherein the localization unit is configured to compare the satellite signal in the first signal path which are conditioned by the first analysis unit with the satellite signal in the second signal path.

10. The system as set forth in claim 4, wherein the localization unit is configured to determine a corrected position whose plausibility has been checked with the aid of alternative locating methods.

11. The system as set forth in claim 4, wherein the localization unit is configured to create a movement trajectory on the basis of past positions whose plausibility has been checked and to identify a discontinuity between the currently determined position and the movement trajectory.

12. The system as set forth in claim 11, wherein the localization unit is configured to extend the movement trajectory into the future utilizing odometry data.

13. A method for determining a position of a vehicle, the method comprising:
receiving, at an antenna, satellite signals;
distributing the satellite signals to a first signal path and a second signal path separate from the first signal path;
conditioning the satellite signals along each signal path;
analyzing the conditioned satellite signals along each signal path;
determining a first position measured values using at least two of a first position, a first speed, and a first satellite time with a first position determination unit with the conditioned satellite signals along the first signal path, the analyzed satellite signals along the first signal path are within a first frequency of a first satellite signal type; and
determining a second position measured values using at least two of a second position, a second speed, and a second satellite time with a second position determination unit with the conditioned satellite signal along the second signal path, the analyzed satellite signals along the second signal path are within a second frequency of the first satellite signal type;
comparing the satellite signals along the first signal path with the satellite signals along the second signal path;
determining an error in the satellite signals based on the comparison;
determining a difference by comparing the first position and the second position;
when the difference exceeds a threshold value, determining that the first signal path and/or the second signal path are subject to the error; and
when the difference does not exceed the threshold value, determining the position based on the first position and the second position.

14. The method as set forth in claim 13, further comprising receiving the positions determined by the position determination unit at a localization unit and determining positions whose plausibility has been checked.

15. The method as set forth in claim 13, further comprising rejecting the determined position if the difference exceeds a threshold value.

* * * * *